Figure 1:
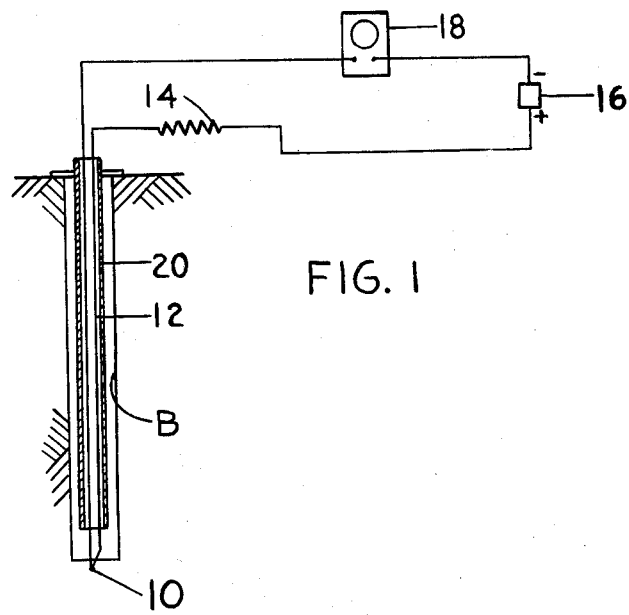

April 26, 1960 S. W. MILOCHIK 2,933,923
METHOD FOR DETECTING UNDERGROUND RADIOACTIVE DEPOSITS
Filed Aug. 20, 1956 2 Sheets-Sheet 1

INVENTOR
Stephen W. Milochik
BY E. H. Schmidt, Jr.
ATTORNEY

April 26, 1960  S. W. MILOCHIK  2,933,923
METHOD FOR DETECTING UNDERGROUND RADIOACTIVE DEPOSITS
Filed Aug. 20, 1956  2 Sheets-Sheet 2

INVENTOR.
Stephen W. Milochik

United States Patent Office 2,933,923
Patented Apr. 26, 1960

2,933,923

METHOD FOR DETECTING UNDERGROUND RADIOACTIVE DEPOSITS

Stephen W. Milochik, Linden, N.J.

Application August 20, 1956, Serial No. 605,037

2 Claims. (Cl. 73—154)

My invention relates to a method for detecting radioactive ore deposits and is directed particularly to a method for prospecting for uranium and thorium ore deposits located below the earth surface. I call my method HONDUT, which is an abbreviation of "Heat of Natural Disintegration of Uranium-Thorium."

Uranium and thorium ore bodies are often located at a considerable distance below the earth's surface so that they are difficult, if not impossible, to detect by even the most sensitive Geiger counter or other scintillation type devices. It has been the usual practice in cases where, for geological, topographical or other reasons it was considered possible that uranium- or thorium-bearing ore bodies might be located underground, to drill to considerable depths to locate the ore body. Such operations are time-consuming and expensive, and limit the amount of territory that can be surveyed during a given period of time.

It is accordingly the principal object of my invention to provide a method for exploring for uranium- and thorium-bearing ores located deep beneath the earth's surface without resorting to deep drilling on a hit-or-miss basis.

It is another object of my invention to provide a method for exploring for uranium and thorium which requires only a small amount of comparatively inexpensive and readily portable equipment, which is rapid and efficient and therefore enables a prospector developing a favorable area to survey a comparatively large area in a given amount of time as compared with prior exploration techniques, which is accurate in pin-pointing the location of underground radioactive ore bodies, and which can be conveniently carried by a single prospector working alone.

Other objects, features and advantages of my invention will become apparent from the following description of the invention when read with reference to the appended drawings.

Figure 2:
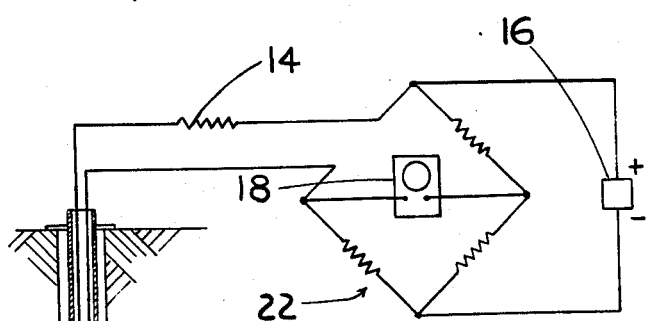
Figure 3:
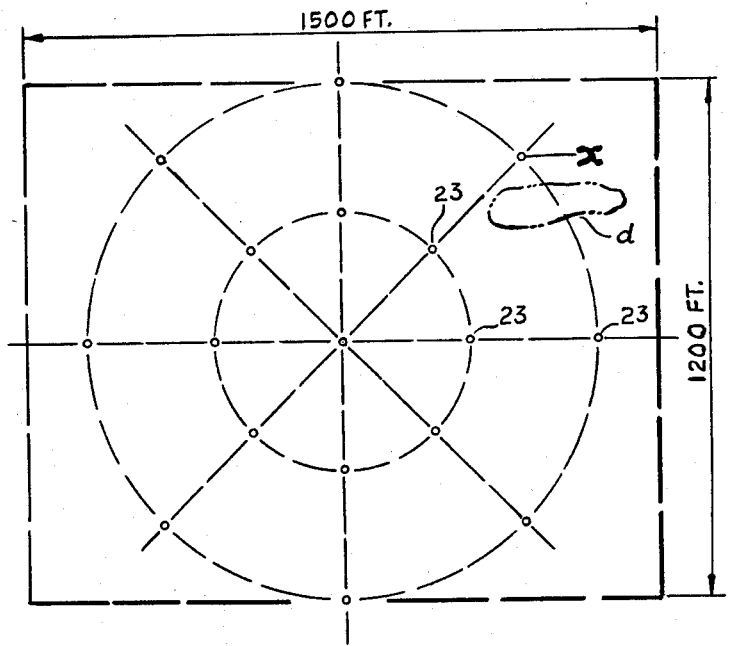
Figure 4:
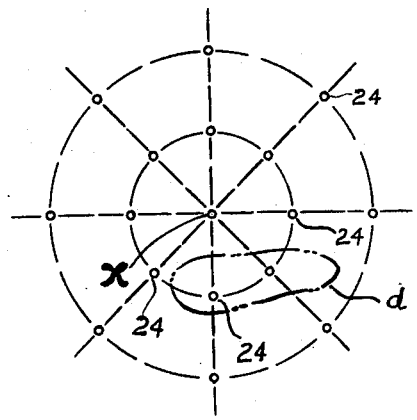

In the drawings,

Fig. 1 illustrates a circuit drawing of the apparatus according to the invention shown in use in making preliminary earth temperature measurements, Fig. 2 is a circuit diagram of an apparatus according to the invention shown in use in making precise earth temperature measurements in instances warranted by the measurements indicated by the apparatus shown in Fig. 1, Fig. 3 shows a first circular drilling pattern about a central point in a claims groups, and Fig. 4 shows a second circular drilling pattern about a selected bore of the first drilling pattern of Fig. 3.

My invention is founded on the fact that the heat of natural disintegration of uranium and thorium in ore, while in itself minute nevertheless results in a measurable temperature elevation in the ore body and the earth surrounding the ore body, which can be taken as an indication of the presence of radioactive uranium and/or thorium ore bodies. On page 152 of Nuclear Geology by Henry Faul, copyright 1954 by John Wiley & Sons, Inc., there is given the following table substantiating the proposition that the heat of natural disintegration of uranium and thorium in ore over geological periods of time can be utilized as a practical test of the presence of underground uranium and/or thorium bearing ore bodies:

*Estimates of heat generation in cal./gram-year*

| Author | Date | Uranium | Thorium |
|---|---|---|---|
| Holmes and Lawson | 1926 | 0.79 | 0.23 |
| Urry | 1941 | 0.704 | 0.20 |
| Evans and Goodman | 1941 | 0.741 | 0.203 |
| Bullard | 1942 | 0.723 | 0.200 |
| Henry Faul | 1953 | 0.73 | 0.200 |

By means of apparatus hereinbelow described, it is possible to measure the heating effect of uranium, or thorium-bearing ore bodies located at considerable distances under the earth's surface, depending upon the size and richness of the ore body, in test bores only five or six feet deep. By measuring the temperature at the bottom of a series of such shallow bores spaced about 300 feet apart along the ground, for example, it is possible to chart a temperature curve which is sufficiently precise to indicate the temperature rises of such small amounts as might probably be due to the heating effect of uranium and thorium distintegration.

For instance, if a block of two claims measuring 1200 feet by 1500 feet is to be surveyed (see Fig. 3), I preferably start from the center of the claims group and drill bores 23 at the center and spaced at 45° angles about circles having radii of 300 and 600 feet from the center, thereby making a total of seventeen bores. Any one of such bores can serve as the center point of a new set of bores taken at radii equal to one-half (or 150 and 300 feet in this example) of the original radii. Thus, in Fig. 3 the bore x, indicating a higher temperature than the rest, was selected as the central point of a new set of bores 24, as illustrated in Fig. 4. In this way the ore deposit can be delineated. This circular method of surveying is preferred because many of the radioactive material bearing ore bodies are of curved shape.

Since the earth is a comparatively poor conductor of heat, as evidenced by the fact that the frost line is shallow even in winter, atmospheric temperature changes at the earth's surface have substantially no effect upon the test measurements being taken at the bottom of the test bores. Whatever effect it has is the same in all the bores so that a temperature differential, which is the important factor, can be measured. Thus, by means of the technique and apparatus hereinbelow more fully described, it is possible to obtain temperature readings which are not affected to any substantial degree of atmospheric temperature.

In accordance with another feature of my invention, two temperature measuring devices are used in my method of prospecting, the first of which is used for preliminary examination of the area being explored, and the second of which is used for final, more accurate, temperature examination, if indicated as being warranted by the results of the preliminary examination.

Referring now to Fig. 1, the preliminary examination device comprises a temperature sensing element 10 preferably a bead-type thermistor enclosed in a glass probe, connected at one end of a two-conductor cable 12 the other end terminals of which are connected in series with a current limiting resistor 14, a low voltage D.-C. source 16, the voltage being small enough not to have a heating effect on the thermistor, and a sensitive vacuum tube microammeter 18. The vacuum tube microammeter preferably has a .01 microampere full scale as its most sensitive current reading. The resistor 14 is a current limiting resistance which prevents heating of the thermistor due to its negative coefficient of resistance.

In operation, the thermistor 10 is lowered by its cable 12 through a hollow tube 20 which has been placed in the small diameter bore B drilled into the earth to a depth of about six feet. Preferably, the diameter of the bore is one inch, or less. The tube 20 is positioned in the bore B so that its lower end is about a foot above the bottom of the bore. The thermistor 12 is lowered through the tube 20 and pushed in firm contact with the earth at the bottom of the bore.

In accordance with the method of my invention, I prepare the series of earth bores to be temperature-measured a day or so in advance, and take readings in one bore after another in rapid succession, preferably just before sunrise. If the current readings from bore to bore vary by any appreciable amount, which will be indicative of corresponding temperature variation from bore to bore, a second series of readings is immediately taken using a Wheatstone bridge circuit 22 (Fig. 2) utilizing the vacuum tube microammeter 18 as the null-indicating instrument. In this way, using the sensitive 0 to .01 microampere scale of the instrument, and with appropriate ratio arm resistances, current differences of about .0002 microamperes can easily be read. A magnifying glass can be used to obtain extremely sensitive null readings. Thus a very sensitive bridge balance can be achieved, so that the thermistor circuit resistance is read with great accuracy. Since the resistance readings taken by the device shown in Fig. 2 are substantially proportional to the temperature of the thermistor 10 within the small range of temperatures that might be measured, variation in resistance reading from bore to bore correspond to proportional temperature changes. By knowledge gained from experience of the range of temperature variation that might be expected in a series of bores in an area not influenced by heat of distintegration of uranium or thorium, temperature readings in excess of such normal variation range for a particular locality can be taken as evidence that uranium- or thiorium-bearing ore bodies may be located beneath the surface. If other factors, such as underground water flow, which will effect underground temperature variations from place to place in the area being surveyed are ruled out, such temperature variations detected can be good indications of underground uranium or thorium deposits. By means of closer surveying, the suspected area with the sensitive measuring device described in Fig. 2, the locality of highest heat concentration can be determined, at which point ordinarily used, deep drilling operations can be undertaken with a greater possibility of success than heretofore possible.

While I have described a preferred embodiment of my invention, it is to be understood that this disclosure is for the purpose of illustration only and that various omissions, or changes in arrangement of parts, as well as the substitution of equivalent elements for those herein shown and described, may be made without departing from the spirit and scope of the invention as set forth in the appended claims.

What I claim is:

1. A method for detecting underground radioactive ore deposits which comprises drilling a bore about six feet deep and about one inch in diameter in the center of the area to be explored, drilling a plurality of pairs of aligned bores about six feet deep and about one inch in diameter, each pair being equidistantly spaced along one each of a plurality of equiangularly spaced radii about said center bore, measuring the earth temperature at the bottoms of said bores to determine particularly a bore exhibiting a variation in temperature which may be due to a nearby underground deposit of radioactive ore, and then repeating the above steps with respect to bores drilled about said particular bore at half said equidistantly-spaced distances with respect to their respective radii to more closely approach the source of underground heat with a minimum of drilling.

2. The method of detecting underground radioactive ore deposits which comprises drilling a bore about six feet deep and about one inch in diameter in the center of the ground area to be explored, drilling a plurality of pairs of aligned bores about six feet deep and about one inch in diameter, each pair being spaced at 300 foot intervals along one each of eight radii mutually spaced at 45 angular degrees about said center bore, measuring the earth temperature at the bottoms of said bores before sunrise to determine a particular bore exhibiting a variation in temperature which may be due to a nearby underground deposit of radioactive ore, and then repeating the above steps with respect to bores drilled about said particular bore at half said equidistantly-spaced distances with respect to their respective radii to more closely approach the source of underground heat with a minimum of drilling.

References Cited in the file of this patent

UNITED STATES PATENTS

| | | |
|---|---|---|
| Re. 22,345 | Blau | July 13, 1943 |
| 2,343,520 | Baver et al. | Mar. 7, 1944 |
| 2,370,793 | Horvitz | Mar. 6, 1945 |
| 2,465,563 | Abrams | Mar. 29, 1949 |

OTHER REFERENCES

Article, The Thermopile Proven Useful in Geophysical Survey by J. N. A. van Den Bouwhuizsen—in Engineering & Mining Journal, vol. 135, No. 8, Aug. 1934. Pages 342–344.